US007278120B2

(12) United States Patent
Rahmat et al.

(10) Patent No.: US 7,278,120 B2
(45) Date of Patent: Oct. 2, 2007

(54) METHODS AND APPARATUSES FOR TRANSIENT ANALYSES OF CIRCUITS

(75) Inventors: Khalid Rahmat, Fremont, CA (US); Kenneth S. McElvain, Menlo Park, CA (US)

(73) Assignee: Synplicity, Inc., Sunnyvale, CA (US)

( * ) Notice: Subject to any disclaimer, the term of this patent is extended or adjusted under 35 U.S.C. 154(b) by 189 days.

(21) Appl. No.: 10/897,459

(22) Filed: Jul. 23, 2004

(65) Prior Publication Data

US 2006/0031795 A1 Feb. 9, 2006

(51) Int. Cl.
*G06F 17/50* (2006.01)
(52) U.S. Cl. .......................................................... 716/2
(58) Field of Classification Search .................... 716/5, 716/6, 2
See application file for complete search history.

(56) References Cited

U.S. PATENT DOCUMENTS

| 6,086,629 A * | 7/2000 | McGettigan et al. .......... 716/12 |
| 6,559,701 B1 * | 5/2003 | Dillon .......................... 327/293 |
| 6,584,606 B1 * | 6/2003 | Chiu et al. ...................... 716/10 |
| 6,651,229 B2 * | 11/2003 | Allen et al. ...................... 716/6 |
| 6,687,883 B2 * | 2/2004 | Cohn et al. ...................... 716/4 |
| 6,876,210 B2 * | 4/2005 | Shimazaki et al. .......... 324/750 |
| 6,898,769 B2 * | 5/2005 | Nassif et al. .................... 716/5 |
| 6,941,258 B2 * | 9/2005 | Van Heijningen et al. .... 703/16 |
| 7,000,214 B2 * | 2/2006 | Iadanza et al. ............... 716/18 |
| 7,137,080 B2 * | 11/2006 | Acar et al. ...................... 716/2 |
| 2002/0022951 A1 * | 2/2002 | Heijningen et al. ........... 703/16 |
| 2002/0133792 A1 * | 9/2002 | Raghunathan et al. ......... 716/4 |
| 2004/0030511 A1 * | 2/2004 | Tien et al. ...................... 702/60 |
| 2004/0083011 A1 * | 4/2004 | Ganz et al. ................... 700/19 |
| 2005/0028127 A1 * | 2/2005 | Mauersberger ............... 716/18 |
| 2005/0091623 A1 * | 4/2005 | Zettler et al. ................... 716/6 |
| 2005/0097494 A1 * | 5/2005 | Kitahara et al. .............. 716/11 |
| 2005/0138588 A1 * | 6/2005 | Frenkil .......................... 716/6 |
| 2006/0031795 A1 * | 2/2006 | Rahmat et al. ................. 716/5 |

OTHER PUBLICATIONS

Howard Chen and David D. Ling, "Power supply noise analysis and methodology for deep-submicron VLSI chip design," in Proc. DAC, pp. 638-643. 1997.

(Continued)

*Primary Examiner*—Jack Chiang
*Assistant Examiner*—Suchin Parihar
(74) *Attorney, Agent, or Firm*—Blakely, Sokoloff, Taylor Zafman LLP

(57) ABSTRACT

Methods and apparatuses for transient analyses of a circuit using a hierarchical approach. In one embodiment, the cells are grouped locally on the power supply network according to average power dissipation. A time varying current of each cell group is estimated using a probabilistic approach to represent the cell group so that the probability of a more severe waveform for the current of the cell group is under a certain level. For example, the cells in a group are partitioned as switching cells and non-switching cells using cell toggle rates for the determination of the time varying current. The circuit model of the power supply network includes the current sources according to the estimated time varying currents for the cell groups, the power supply wire resistance, the power supply to ground wire capacitance, well capacitance and the de-coupling capacitance from non-switching cells.

51 Claims, 11 Drawing Sheets

OTHER PUBLICATIONS

Abhijit Dharchoudhury, et al., "Design and analysis of power distribution networks in PowerPC microprocessors," in Proc. DAC, pp. 738-743, 1998.

Yi-Min Jiang, et al., "VIP—an input pattern generator for identifying critical voltage drop for deep submicron designs," in ISLPED, pp. 156-161, 1999.

Angela Krstic C and Kwang-Ting (TIM) Cheng, "Vector generation for maximum instantaneous current through supply lines for CMOS circuits," in Proc. DAC, pp. 383-388, 1997.

Sani R. Nassif and Joseph N. Kozhaya, "Fast power grid simulation," in Proc. DAC, pp. 156-161, 2000.

Tsung-Hao Chen and Charlie Chung-Ping Chen, "Efficient large-scale power grid analysis based on pre-conditioned Krylov-subpace iterative methods," in Proc. DAC, 2001.

Narain D. Arora, et al., "Modeling and extraction of interconnect capacitance for multilayer VLSI circuits," IEEE Tran. On Computer Aided Des. Of Integrated Circuits and Systems, vol. 15, pp. 58-67, 1996.

Synopys, "Star-RCXT: Fast, Accurate, 3-D Full-Chip Extraction", copyright 2003.

Sequence Design, Inc., "Columbus—RLC Extraction for Nanometer SoC Design", copyright 2005.

* cited by examiner

METHODS AND APPARATUSES FOR TRANSIENT ANALYSES OF CIRCUITS

FIELD OF THE TECHNOLOGY

Some embodiments of the present invention relate to automated circuit analyses, and more particularly to the transient analyses of power supply network of a circuit implemented on an Integrated Circuit (IC) chip.

BACKGROUND

Power dissipation in integrated circuits increases as chip frequencies and die area increase. Lowering the power supply voltage has mitigated the rapid increase in power dissipation for designs in newer process technologies but at the cost of larger power supply currents. The electronic current supplied by the power supply grid to each standard cell or custom block (such as a memory) on an Integrated Circuit (IC) chip causes a voltage drop in the supply network due the non-zero impedance (resistance, capacitance and inductance). The voltage drop, if large enough, can cause functional failures. However, even smaller voltage drops that are only a fraction of the power supply voltage can cause timing errors, because the reduced supply voltage increases the delay of logic gates. If the increased delays are not accounted for accordingly, the results of chip timing analyses can be erroneous. Further, large electronic currents can cause failures if the peak current exceeds limits set by the material parameters for the power supply wires. Thus, the design process of a digital circuit typically includes an analysis of the power supply network.

For the design of digital circuits (e.g., on the scale of Very Large Scale Integration (VLSI) technology), designers often employ computer-aided techniques. Standard languages such as Hardware Description Languages (HDLs) have been developed to describe digital circuits to aid in the design and simulation of complex digital circuits. Several hardware description languages, such as VHDL and Verilog, have evolved as industry standards. VHDL and Verilog are general-purpose hardware description languages that allow definition of a hardware model at the gate level, the register transfer level (RTL) or the behavioral level using abstract data types. As device technology continues to advance, various product design tools have been developed to adapt HDLs for use with newer devices and design styles.

In designing an integrated circuit with an HDL code, the code is first written and then compiled by an HDL compiler. The HDL source code describes at some level the circuit elements, and the compiler produces an RTL netlist from this compilation. The RTL netlist is typically a technology independent netlist in that it is independent of the technology/architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation). A mapping operation is then performed to convert from the technology independent RTL netlist to a technology specific netlist, which can be used to create circuits in the vendor's technology/architecture. It is well known that FPGA vendors utilize different technology/architecture to implement logic circuits within their integrated circuits. Thus, the technology independent RTL netlist is mapped to create a netlist, which is specific to a particular vendor's technology/architecture.

One operation, which is often desirable in this process, is to plan the layout of a particular integrated circuit and to control timing problems and to manage interconnections between regions of an integrated circuit. This is sometimes referred to as "floor planning." A typical floor planning operation divides the circuit area of an integrated circuit into regions, sometimes called "blocks," and then assigns logic to reside in a block. These regions may be rectangular or non-rectangular. This operation has two effects: the estimation error for the location of the logic is reduced from the size of the integrated circuit to the size of the block (which tends to reduce errors in timing estimates), and the placement and routing typically runs faster because as it has been reduced from one very large problem into a series of simpler problems.

Before the placement and routing operation, the timing of signals are typically estimated from parameters such as the fanout of a net and the estimated wire lengths (e.g., obtained from a route estimation). After placement of components on the chip and routing of wires between components, timing analysis (e.g., timing simulation, or static timing analysis) can be performed to accurately determine the signal delays between logic elements. Further, an analysis of the power supply network can be performed based on the detailed design information.

Currently most techniques for power supply voltage drop estimation rely on a static or DC (Direct Current) analysis of the power supply network (the power grid). In a static or DC analysis, an average or DC current, which is assumed to be constant, is used to represent the actual time varying current in the analysis of the power supply network. The voltage drops in the power supply network are calculated using the average or DC representation of the currents drawn by the cells (e.g., logic gates) of the circuitry.

However, the cells of the circuitry draw time-varying currents from the power supply network in performing state switching activities. Thus, such a traditional DC approach has a number of shortcomings. A traditional DC analysis does not provide any transient voltage drop information. The results of a DC approach are not accurate and could not account for many physical effects such as the placement of de-coupling capacitors or the speed of the transitions of the standard cell outputs.

The actual voltage drop in the power supply network can be much worse than that calculated by the DC analysis because many gates can switch simultaneously, requiring a much larger instantaneous current from the power network than the average current assumed in the DC analysis.

The capacitance and inductance of the power supply network have no impact on the DC analysis, since only the resistance matters in a DC analysis. Therefore, the capacitance and inductance of the power supply network cannot be optimized or analyzed using a DC approach, although in reality they can play a critical role in the actual instantaneous voltage drop.

The timing of the transition of the gates has no effect on the DC analysis. However, whether the logic gates switch simultaneously or in different time windows can produce significantly different power supply voltage drops.

Further, techniques to reduce the peak voltage drop such as the placement and sizing of de-coupling capacitors or different chip packages cannot be analyzed by the traditional DC analysis, since these elements cannot be accounted for in a DC analysis.

A transient analysis of the power supply network may be performed through a detailed circuit level simulation (e.g., using SPICE, Simulation Program with Integrated Circuit Emphasis). Such a detailed circuit level simulation requires transistor level models for every cell. The complexity of the transistor level models severely limits the size of the problem that could be solved. Further, such a detailed circuit level analysis requires stimuli at the inputs of the circuit. Furthermore, the detailed circuit level analysis would have to be performed for each input stimulus applied to the circuit to determine the worst case scenario.

Chen and Ling (1997) described a hierarchical approach for power supply noise analysis in "Power Supply Noise Analysis Methodology for Deep-Submicron VLSI Chip Design", Proc. of Design Automation Conference (DAC), 1997. In the approach of Chen and Ling (1997), the simulation results of functional blocks are used to replace the nonlinear devices and capacitive loads with piecewise linear current sources, which mimic the waveforms of the actual circuits. After the equivalent circuit with the piecewise linear current source for each functional block is generated, the equivalent circuit is used to represent the functional block in the analysis of the top level power network. Similarly, Dharchoudhury et al. described a hierarchical approach in "Design and Analysis of Power Distribution Networks in PowerPC™ Microprocessors", Proc. of Design Automation Conference (DAC), 1998. After simulating the non-linear devices under the perfect supply voltage to measure the currents drawn by the devices, Dharchoudhury et al. (1998) models the non-linear devices as independent time varying current sources, according to the measured currents, for the simulation of the power grid. However, these approaches require detailed transistor level analyses of the functional blocks. Further, these approaches may only be suitable for the circuits that are designed in a hierarchical way with an obvious block structure. Furthermore, the simulation of a function block requires the generation of input vectors that provide stimulus to the cells in the block. It is difficult to generate input vectors for the efficient simulation of a function block while obtaining a reasonable worst-case switching current for the function block.

SUMMARY OF THE DESCRIPTION

Methods and apparatuses for transient analyses of a circuit using a hierarchical approach are provided here. Some embodiments of the present invention are summarized in this section.

In one embodiment of the present invention, the cells are grouped locally on the power supply network according to average power dissipation (e.g., so that cell groups have approximately equal power dissipation). A time varying current of each cell group is estimated using a probabilistic approach to represent the cell group so that the probability of a more severe waveform for the current of the cell group is under a certain level. For example, the cells in a group are partitioned as switching cells and non-switching cells using cell toggle rates for the determination of the time varying current. The circuit model of the power supply network includes the current sources according to the estimated time varying currents for the cell groups, the power supply wire resistance, the power supply to ground wire capacitance, well capacitance for cells with wells tied to power supply or ground wires, and the de-coupling capacitance from non-switching cells.

In one aspect of the present invention, a machine implemented method for circuit analysis includes: grouping cells of a design of a circuit into cell groups according to a threshold for power dissipation; and, determining parameters specifying a time varying current, drawn by each of the cell groups from a power supply network of the circuit, for a transient analysis of the power supply network of the circuit. In one example of an embodiment, the method further includes: performing the transient analysis of the power supply network of the circuit using the parameters specifying the time varying current determined for each of the cell groups. For example, the cells of the design may be grouped locally on the power supply network of the circuit so that cells within each of the cell groups are contiguous on the power supply network of the circuit. The threshold for power dissipation may be used to specify a limit of average power dissipation in each cell group. In one example of an embodiment, the design of the circuit includes a gate level design; and, the cells of the design include technology specific standard cells for implementing the circuit on an Integrated Circuit (IC) chip. In one example of an embodiment, at least one of the parameters specifying the time varying current is determined for each of the cell groups using data indicating probabilities of state switching at cells (e.g., toggle rates of cells). In one example of an embodiment, determining the parameters specifying the time varying current includes: estimating a switching current for each cell of each of the cell groups using data specifying energy dissipation at a corresponding cell during a state transition in a clock cycle; and, determining a number of first cells that switch in a same clock cycle for each of the cell groups using the data indicating probabilities of state switching at cells; where the time varying current drawn by each of the cell groups includes at least switching currents for the number of the first cells that switch in a same clock cycle. In one example of an embodiment, the number of the first cells is determined for each of the cell groups such that a probability of more than the number of cells switching in a same clock cycle is less than a threshold value (e.g., 0.9 or 0.99). In one example of an embodiment, the number of the first cells are determined for each of the cell groups to maximize a peak value of the time varying current while the probability of more than the number of cells switching in a same clock cycle is close to the threshold value. In one example of an embodiment, the transient analysis is performed through solving a set of linear equations with a sparse matrix obtained from discretizing a set of ordinary differential equations based on current sources according to the time varying current for each of the cell groups, resistance and capacitance parameters of the power supply network, well capacitance parameters, and decoupling capacitance parameters. The decoupling capacitance parameters of second cells that are not switching are determined for each of the cell groups but excluding the number of the first cells that are switching; the resistance and capacitance parameters of the power supply network and the well capacitance parameters of wells of cells are extracted from the design of the circuit.

In one aspect of the present invention, a machine implemented method for circuit analysis includes: determining a representation of a first current, drawn by a group of cells from a power supplying network of a circuit in a clock cycle, using data indicating probabilities of state switching at the cells of the group (e.g., toggle rates of the cells), where the representation of the first current specifies the first current as a non-constant function of time in a clock cycle. In one example of an embodiment, the cells are technology specific standard cells for implementing the circuit on an Integrated Circuit (IC) chip. In one example of an embodiment, a first number is determined from the data indicating probabilities of state switching at the cells of the group such that a probability of more than the first number of cells of the group switching in a same clock cycle is about a predetermined value; and then, first cells of the first number are selected from the group to determine the representation of the first current from currents drawn by the first number of the first cells when the first cells switch together in a same clock cycle. In one example of an embodiment, a representation of a second current drawn by one of the cells of the group is determined to specify the second current as a non-constant function of time in a clock cycle in determining the representation of the first current; and the representation of the second current is determined from an amount of energy dissipation in the one of the cells during switching in state in a clock cycle. In one example of an embodiment, equivalent resistance and capacitance parameters for second cells of the group (not including any of the first cells) when the second cells do not switch are further determined. In one example of an embodiment, the group of cells is modeled using at least a current source according to the representation of the first current and the equivalent resistance and capacitance parameters. In one example of an embodiment, the group of cells is further modeled using the well capacitance parameters determined for the cells of the group. In one example of an embodiment, cells of a design of the circuit are selected into the group so that an average power dissipation of the group is at about a predetermined level.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
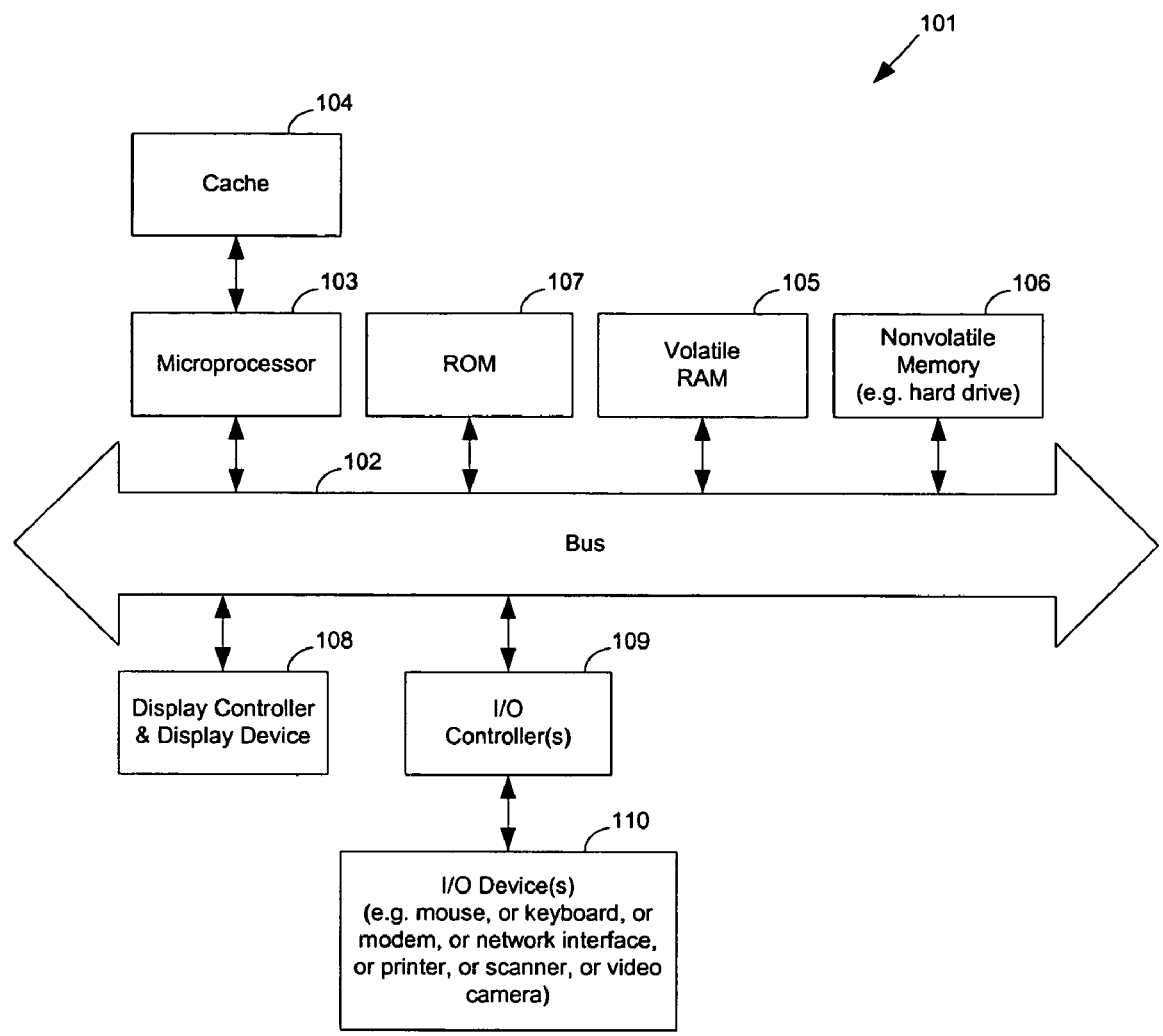
FIG. 1 shows a block diagram example of a data processing system which may be used with the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

At least one embodiment of the present invention merges groups of contiguous cells in such a way that the time-varying behavior is preserved while reducing the number of independent load currents that have to be analyzed to produce accurate results with minimal run time and memory usage. In one embodiment, the time varying switching currents for the cell groups are estimated based on a probabilistic approach without a detailed simulation of the cell groups. A circuit model representing the power supply network is generated from current sources according to the time varying switching currents for the cell groups, as well as the resistance and capacitance parameters of the power supply network, such that instantaneous (or dynamic or transient) power network analyses can be performed efficiently using the circuit model for the power supply network. No detailed switching of individual elements in the circuit model is necessary for the simulation of the power supply network. Further details are described below.

A detailed design of a circuit may be specified at the gate level with a netlist (e.g., in a HDL), physical layout information for the circuit, and technology dependent information of the wires and cells for the implementation of the circuit on an IC chip. The switching activities of the gates in each clock domain can be represented using toggle rates of the gates. Toggle rate of a gate represents the likelihood of the gate switching in a clock cycle. Toggle rates of cells can be estimated, or derived from converting statistical data about switching activities collected over many clock cycles to the probability of switching in a given clock cycle.

The toggle rates can be computed at the RTL level and maintained through synthesis; alternatively, the toggle rates can be directly computed at the gate level. For example, U.S. patent application Ser. No. 10/646,657, entitled "Method and Apparatus for Circuit Design and Synthesis" and filed Aug. 21, 2003 by Naresh Maheshwari and Kenneth S. McElvain, describes methods of maintaining and propagating statistical data, such as toggle rates, during and after circuit synthesis transformation operations. The signal switching activities are calculated once at the RTL level and then propagated and/or maintained at various nodes of the circuit through the process of logic synthesis; and the statistical analysis of entire circuit during or after the logic synthesis can be avoided. After each step of synthesis transformation, the statistical data (e.g., data about switching activity) at a node that is affected by the transformation is selectively recalculated from the statistical data maintained at a number of nodes of the design that is before the step of the transformation so that the statistical data can be propagated (and/or maintained) at some of the nodes of the circuit during the process of synthesis transformations. Since many synthesis transformations introduce new nodes (and/or replace elements), new nodes may be selectively determined to maintain and propagate the statistical data; and, statistical data maintained on some of the nodes may be selectively discarded after a transformation. Further details can be found in U.S. patent application Ser. No. 10/646,657, which is hereby incorporated here by reference.

In one embodiment of the present invention, the cells on a power strap or rail are divided into groups of cells. Instead of modeling individual cells separately in the analysis of the entire power supply network, one embodiment of the present invention constructs a circuit model for the cell group based on energy dissipation parameters of the cells and the probabilities of switching of the cells to reduce the independent variables for the analysis of the entire power supply network. In one embodiment, for a group of cells a number of cells that switch together in a same clock cycle are determined according to a probabilistic criterion for a reasonable estimation of the worst-case switching current for the group of cells. The reasonable estimation of the worst-case switching current is calculated for the group of cells based on the characteristics of the cells in the group and the probabilistic criterion so that the probability of cell group drawing a larger current is under a threshold level.

Figure 2:
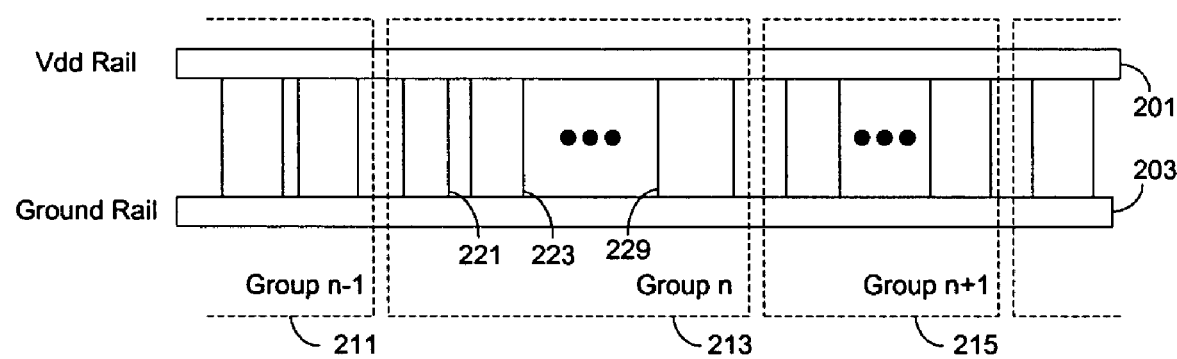
FIG. 2 illustrates a method to group cells according to one embodiment of the present invention.

FIG. 2 illustrates a method to group cells according to one embodiment of the present invention. In a typical standard cell design the cells are arranged in rows with each row supplied by its own power and ground strap (or wire). For example, contiguous cells 221-229 are located between the $V_{dd}$ rail (201) and the ground rail (203) in FIG. 2. In one embodiment, cells that are supplied by the same strap are grouped based on the average power dissipation of the cells; and contiguous cells are grouped into the same group such that the average power of the group is below or about a limit for grouping. For example, cells 221-229 supplied by $V_{dd}$ rail 201 and ground rail 203 are grouped as group n (213) with an average power dissipation that is approximately equal to a predetermined level. Thus, groups n−1, n and n+1 (211, 213 and 215) approximately have the same average power dissipation.

Typically, the average power dissipation of each of the cells can be determined according to the library for standard cells or from the design information for the custom cells or custom blocks. For example, the toggle rate of a cell, the power dissipation of the cell during a switch cycle and the power dissipation of the cell during a non-switch cycle can be used to determine the average power dissipation of the cell.

Even if the cells are not organized in a row fashion, the cells can still be grouped locally on the power supply network. In one embodiment, the contiguous cells on the power supply network are grouped locally, according to the location of the cells on the power supply network, so that the cells in one group are not separated by one or more cells from other groups on the power supply network. Thus, the currents drawn by the cells in the group can be grouped and represented by one current source on the power supply network; and a hierarchical approach can then be used to reduce the independent variables for the top level analysis of the power supply network.

The limit on average power dissipation for the cell groups can be such that a statistically meaningful number of cells (e.g., at least 5 to 10) are in a typical group. Increasing the limit can increase the size of the cell groups, which reduces the number of current sources for the top level analysis of the power supply network but also reduces the resolution of the analysis solution. Thus, the limit on average power dissipation for grouping may also be used to adjust the balance between the computation time for the top level analysis of the entire power supply network and the resolution of the top level solution.

However, it is understood that in general it is not necessary to group all the cells according to a single limit for average power dissipation. For example, cells in different regions may be grouped according to different limits for average power dissipation; a lower limit may be used in areas where a fine resolution is desirable; a higher limit may be used in areas where in areas a coarse resolution is acceptable.

Alternatively, other criteria for limiting the size of cell groups may be used. For example, the cells may be grouped into groups of approximately equal numbers of cells or approximately equal die areas.

In one embodiment of the present invention, the cells of a cell group are divided (or partitioned) into switching cells and non-switching cells for an estimation of a representative current of the group of cells. To create a circuit model of the group of cells, the group of cells may be represented by a state in which the switching cells switch together during a same clock cycle and the non-switching cells do not switch in the clock cycle. The representative current drawn by the group of cells is estimated based on such a state. Details of partitioning the cells into switching cells and non-switching cells using a probabilistic approach according to embodiments of the present invention are described below.

In one embodiment of the present invention, the toggle rates of the individual cells in a group are used as probabilities that these cells (gates) switch in a given cycle. The probability of switching at each cell can be used to calculate the probability that a given number of cells switch in a same cycle. After a cumulative density function (CDF) of the number of cells that switch in a same cycle is calculated, a threshold value, such as 90% or 95% probability, can be used to determine the number (M) of the switching cells for the estimation of the current of the cell group such that the probability of no more than the determined number (M) of switching cells switching together is about the threshold value.

Alternatively, the probabilities of these cells switching in a given cycle can be further used to compute the probabilities of a quantity (e.g., peak current or total charge) at different levels. Each combination of cells switching together in a same cycle has a corresponding value for the quantity (e.g., peak current or total charge) and a probability of occurrence that can be computed (e.g., from the toggle rate). Thus, the probabilities of the quantity at different levels can be computed. After a cumulative density function of the quantity (e.g., peak current or total charge) is computed, a threshold probability level can be used to select the switching cells. For example, in a cumulative density function, the probability of the peak current of a cell group being smaller than a given value increases as the given value increase. The condition that the probability of the peak current of a cell group being smaller than a given value is at a threshold level (e.g., 90% or 95%) can be used to determined the given value, which can be considered as the threshold peak current. For example, the threshold peak current can be determined so that the probability of the peak current of a cell group being smaller than the threshold peak current is 95%. The number of cells that switch in a same clock cycle for the construction of the current of the cell group can then be determined from the threshold peak current. For example, a combination of switching cells that provides a peak group current that is close to the threshold peak current can be selected to determine the switching cells for the construction of the time varying current of the cell group; the probability of the peak current of the cell group being smaller than the constructed time varying current is at the threshold level (e.g., 95%).

Figure 3:
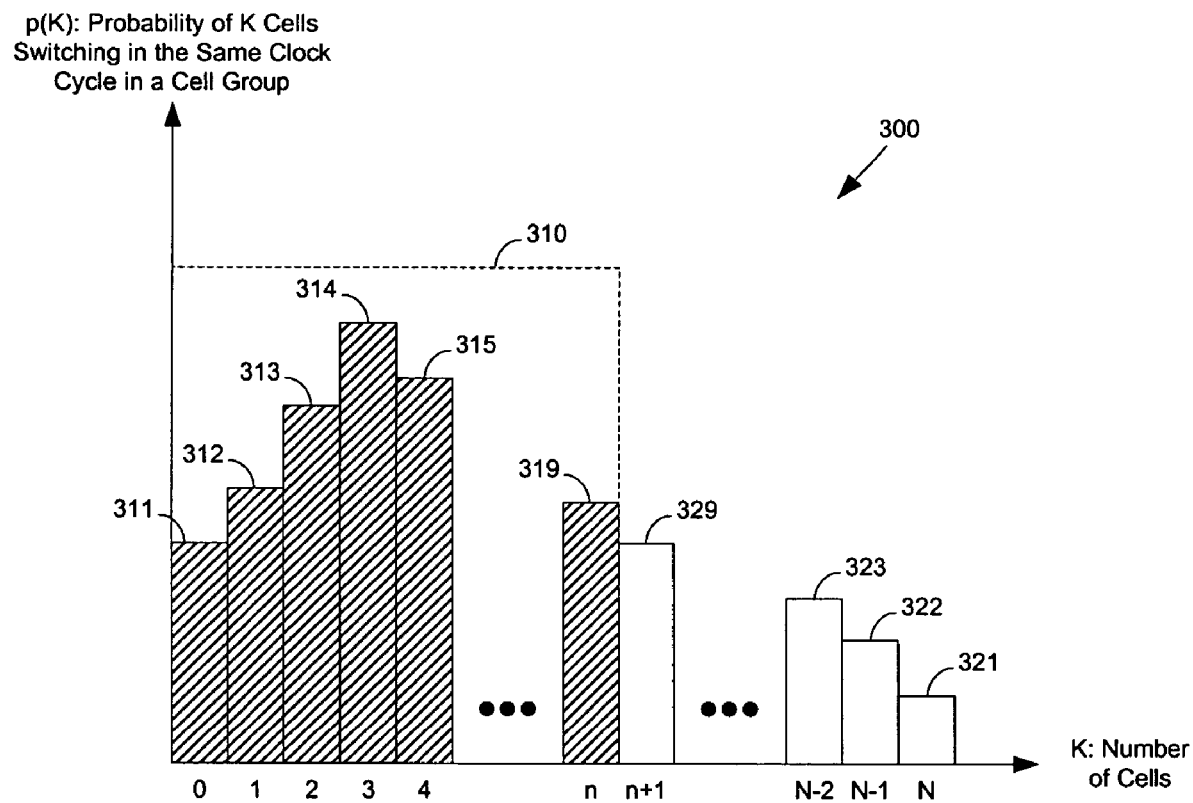
FIG. 3 illustrates the probabilities of cells switching in a same clock cycles, which may be used to determine a switching current of a cell group according to one embodiment of the present invention.

FIG. 3 illustrates the probabilities of cells switching in a same clock cycles, which may be used to determine a switching current of a cell group according to one embodiment of the present invention. For example, bar 311 shows the probability of zero cells of the group of cells switching in a same cycle; bar 319 shows the probability of n cells of the group switching in a same cycle. Summing the probabilities of bars 311-319 (e.g., within area 310) provides the probability of no more than n cells switching in a same cycle. From a threshold value that specifies the probability of no more than n cells switching in a same cycle (or the probability of more than n cells switching in a same cycle), the number M can be determined for the partitioning of the cells. For example, it may be required that the probability of no more than M cells switch in a same clock cycle be about 90% (or 99%). From the toggle rates of the cells and the threshold value, the number M can be determined. It is understood that a threshold of 100% requires all cells in the group to switch in the same cycle.

Figure 4:
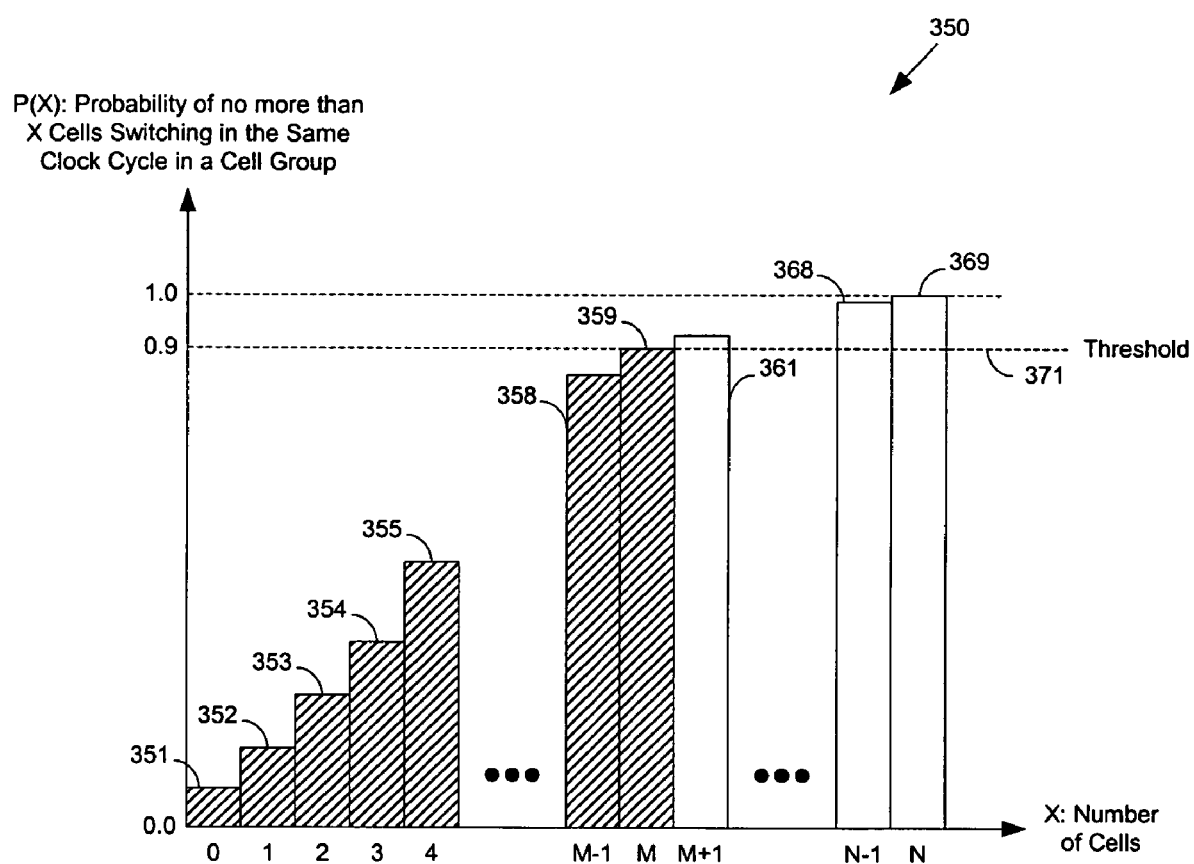
FIG. 4 illustrates a method to determine the number of cells switching a same clock cycle for the determination of a switching current of a cell group according to one embodiment of the present invention.

For the probability distribution as illustrated in FIG. 3, the cumulative probability illustrated in FIG. 4 can be calculated. FIG. 4 illustrates a method to determine the number of cells switching a same clock cycle for the determination of a switching current of a cell group according to one embodiment of the present invention. In FIG. 4, each of the bars (e.g., 351-359, 361-369) represents the probability of no more than a given number of cells switching in the same clock cycle in a cell group. For example, bar 354 represents in the probability of no more than three cells switching in a same clock cycle for the cell group, which is the sum of bars 311-314 of FIG. 3. The bar that is closest in height to the threshold determines the number of switching cells of the group for the estimation of the current drawn by the group of cells. For example, in FIG. 4, the height of bar 359 is closest to the threshold (371); thus, the number of switching cells is determined as M for the group (according to bar 359).

The probabilities of a given number of cells switching in a same clock cycle can be computed from standard combinatorics if the individual probabilities are assumed to be independent. For example, if the probability of switching for cell i is $p_i$ (i=1, 2, . . . , N), the probability of all N cells of the cell group switching in a same clock cycle is:

$$p(N) = p_1 \times p_2 \times \ldots \times p_N = \prod_{i=1}^{N} p_i$$

The probability of N−1 cells switching is:

$$p(N-1) = \sum_{j=1}^{N} \left[\left(\frac{1-p_j}{p_j}\right)\prod_{i=1}^{N} p_i\right]$$

Similarly, the probability of N−2 cells switching is:

$$p(N-2) = \sum_{k=1}^{N}\sum_{j=k}^{N} \left[\left(\frac{1-p_k}{p_k}\right)\left(\frac{1-p_j}{p_j}\right)\prod_{i=1}^{N} p_i\right]$$

The probabilities for other cases can be computed using standard combinatorics in a similar fashion.

If the number of cells in the group is large, the combinatorics method to compute the probabilities may require too much computation time, in which case an approximate algorithm based on the bounds on the tails of the probability distributions can be used to compute the probabilities efficiently.

For example, let $$m = \sum_{i=1}^{N} p_i;$$

N be the number of cells in the group; X be the number of cells that switch in a clock cycle; and the probability of X being more than i be P(X>i). For r>m, bounds for the probability of X being more than m+r include:

$P(X>m+r) \leq (m \times e/r)^r$      Bound 1

$P(X>m+r) \leq e^{(-r \times r/2N)}$      Bound 2

The lower one of the bounds can be used as the probability P(X>m+r). More details about the bounds may be found in *Introduction to Algorithms*, by T. H. Cormen, C. E. Leiserson and R. L. Rivest, McGraw Hill, 1995.

Although the above examples illustrate the situations where it is assumed that cells of a group switch independently from each other, switch activities of many cells are interdependent. For example, a set of cells may switch together. When the logic relations between the cells are available, the logic relations can be used to improve the estimation of the probability distributions. Thus, it is understood that in general it is not necessary to assume that all cells switch independently from each other.

Further, when such dependency information is available, the cells may be grouped further according to the dependency information. For example, the contiguous cells that switch together may be assigned into a same group to avoid splitting them into different groups; cells with strong interdependency in switching activities may be grouped together when possible (e.g., within the limit of power dissipation of the group).

Alternatively, when the statistical data about switching activities collected over many clock cycles is available, the statistical data can be used to derive the cumulative density function for the cell group.

Once the number of switching cells is determined, the switching current that needs to be supplied to these switching cells by the power supply network can be estimated based on the characteristics of the cells of the group.

In one embodiment of the present invention, the current drawn by a switching cell from a power supply network is calculate from the energy dissipated internally by a transition on the output, $E_{int}$, and the energy dissipated by the load capacitance, $E_{load}$ (wire or gate load). Typically, these energy parameters can be determined from the cell library and parasitic data. Further, the leakage power of a cell, which is independent of transitions, is typically also known from the library.

When the transition times and the timing window of the transition in a given clock cycle are available for a cell (e.g., from the result of a static timing analysis or according to default values), an approximate switching current waveform can be estimated for the cell, assuming that all the transition energy is dissipated during the output transition.

For example, if $V_{dd}$ is the nominal power supply voltage, the charge supplied by the power supply is:

$$Q=(E_{int}+E_{load})/V_{dd}$$

If it is assumed that the charge is supplied during the transition time T and the current waveform is a triangular shape, the peak current can be calculated as $$I_{peak}=2\ Q/T=2\times(E_{int}+E_{load})/(V_{dd}\times T)$$

It is understood that the area under the current waveform represents the charges. Thus, when the shape of the waveform and the transition time parameters are available, the waveform of the switching current for the cell can be estimated from the energy dissipation.

Figure 5:
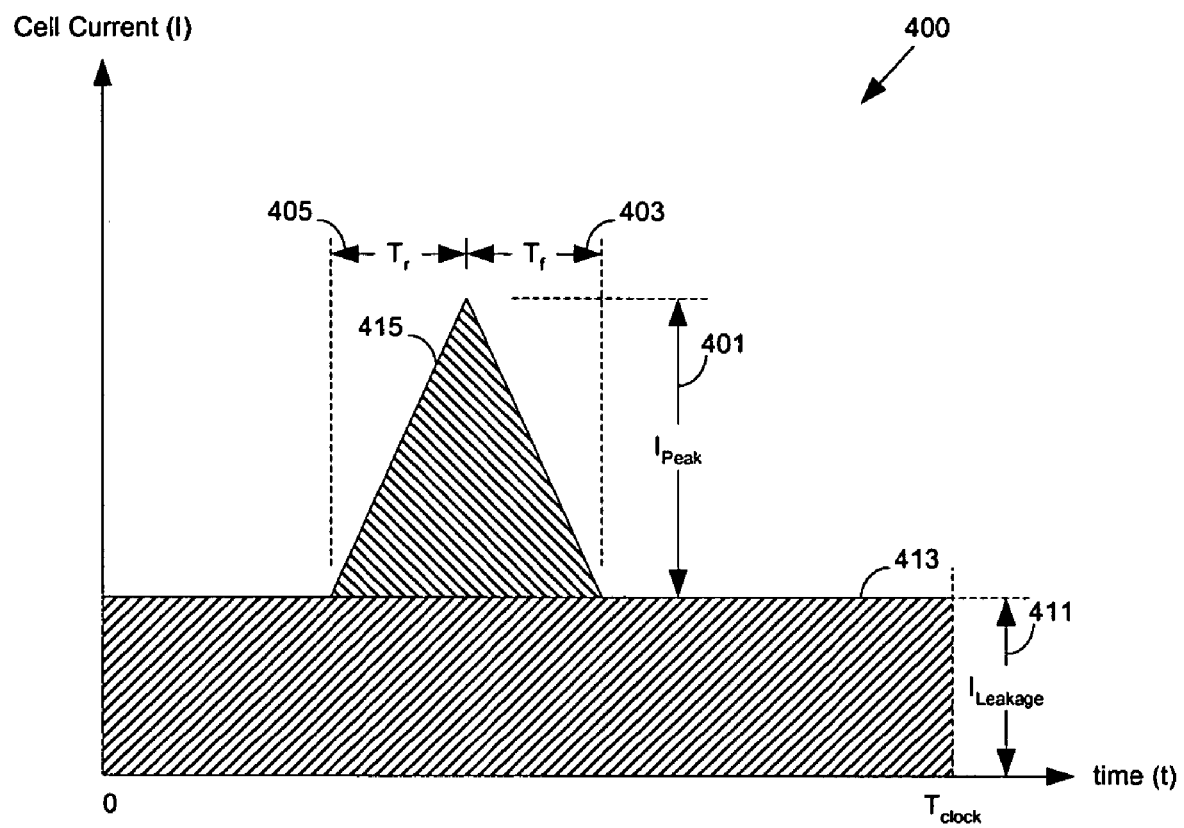
FIG. 5 illustrates a method to estimate the switching current for a cell according to one embodiment of the present invention.

FIG. 5 illustrates a method to estimate the switching current for a cell according to one embodiment of the present invention. In FIG. 5, leakage current $I_{leakage}$ (411) is considered to be constant (413). The switching current 415 is superimposed on the leakage current. The energy dissipation parameters of the cell and the nominal voltage ($V_{dd}$) determine the triangular area under the switching current, which represents the charge supplied by the power supply. Since the raising time $T_r$ (405) and the fall time $T_f$ (403) determine the shape of the triangular waveform of a given area, the peak current $I_{peak}$ (401) can be calculated for the energy dissipation parameters and the timing parameters. When the details about the raising time $T_r$ (405) and the fall time $T_f$ (403) are not available, it may be assumed that $T_r=T_f=T/2$.

Alternatively, when available, the circuit models for cells can also be used to derive the switching current for the individual cells.

In one embodiment of the present invention, the cell group with N cells is modeled according to the state of M switching cells and (N–M) non-switching cells. After the number M is determined from the probability data, a set of M cells are selected as the switching cells to estimate a reasonable worst-case switching current for the cell group. The switching currents of the individual cells are summed to obtain the switching current for the cell group.

In one embodiment of the present invention, the partitioning of the cells of a group is such that the sum of the currents drawn by the N cells has a maximum instantaneous peak value.

Figure 6:
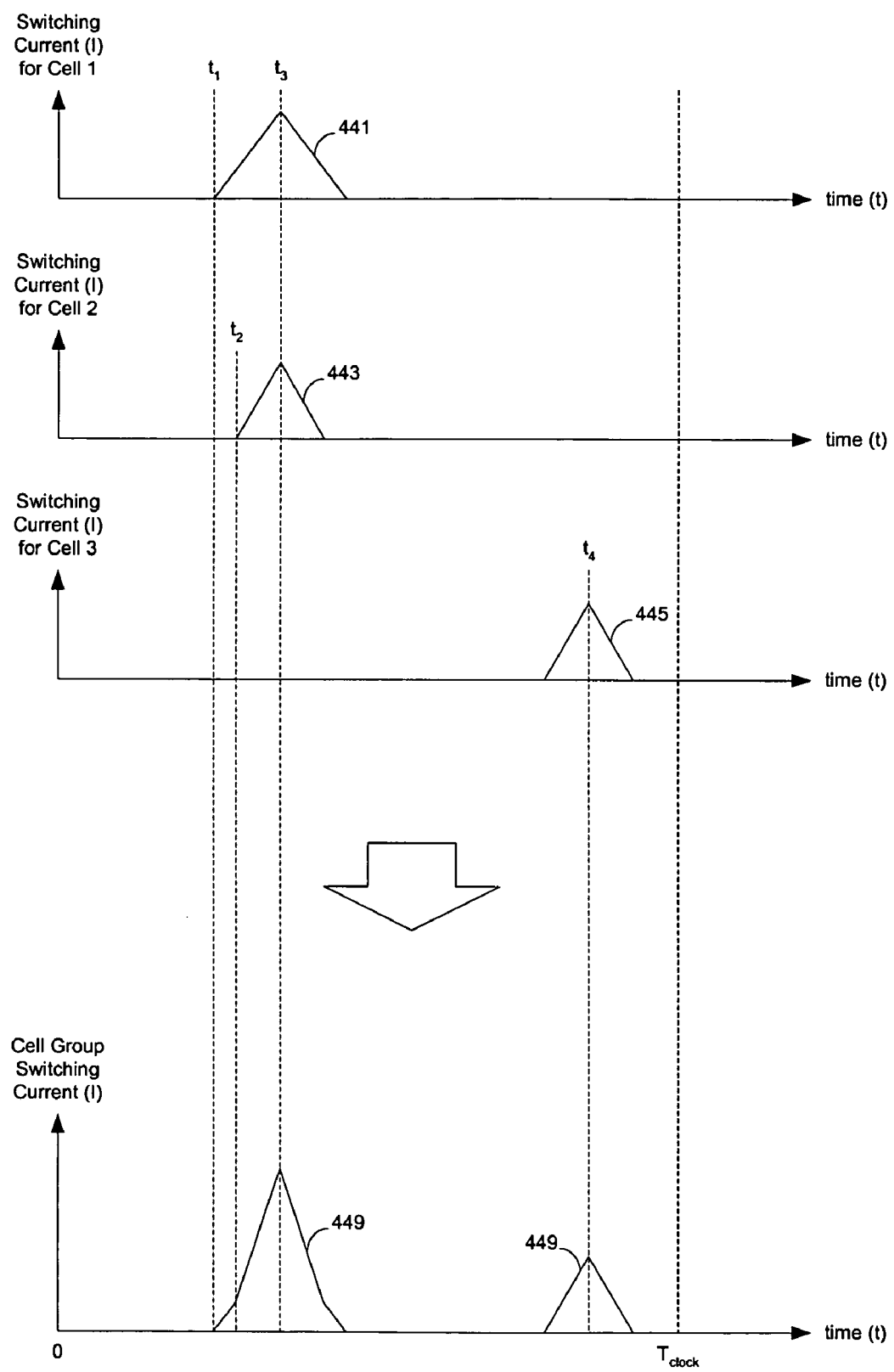
FIG. 6 illustrates a method to determine the switching current for a cell group according to one embodiment of the present invention.

FIG. 6 illustrates a method to determine the switching current for a cell group according to one embodiment of the present invention. In FIG. 6, waveforms 441, 443 and 445 represent the switching currents due to a transition in three switching cells. The portion of the current that is the same regardless whether the cell switches or not in the clock cycle (e.g., the leakage current) is not shown, since the sum of these portions of currents remains the same regardless how the cells are partitioned. If the cells with switching current waveforms 441, 443 and 445 are selected as the switching cells, the switching current waveform for the cell group has the waveform 449, which is the sum of waveforms 441, 443 and 445. If different cells are selected as the switching cells, the cell group will have different peak instantaneous currents. In one embodiment of the present invention, the cell group is partition so that the instantaneous peak current for the group is maximized. It is understood that there may be different partitions that have a same maximum peak value; and any one of these partitions may be selected (e.g., randomly) for the estimation of the time varying current for the cell group.

In one embodiment of the present invention, the timing windows for transitions in a clock cycle are used to select the switching cells. For example, M cells which have overlapping timing windows (e.g., switching at the same time) with the highest peak current in the group are selected as the switching cells to create a waveform which is a sum of the waveforms of these M cells. The timing window information which defines the earliest and latest time within a clock cycle when the output of a given cell can potentially transition may be provided by another software tool, such as a static timing analyzer (STA).

In one embodiment of the present invention, the timing window for the transition of each cell in a group is obtained from the output of the STA tool. In a clock cycle the range of the earliest time instant and the latest time instant between which a transition may occur defines the timing window for the cell. Thus, the output of the cell can change at any time in the timing window to draw a time varying current from the power supply rails. The timing windows for all the M switching cells are considered in one embodiment of the present invention. The subgroups of cells that have overlapping timing windows are first identified. All the timing windows of one subgroup cover at least one common instant; and, a smaller subgroup that is a subset of a larger subgroup may be ignored in view of the larger subgroup. When a subgroup has more than M cells, the cells with smaller peak currents may be ignored so that only M cells are kept in the group. Thus, each subgroup may have 1 to M cells; and some switching cells may be in multiple subgroups. The peak currents for the switching cells in each subgroup are summed as the peak current of the subgroup; and the subgroups are sorted according to the peak currents of the subgroups. Once the subgroup with the highest peak current is selected, the cells of the selected subgroup are removed from the remaining subgroups. The peak currents of the remaining subgroups are updated after removing the cells of the selected subgroup. The next highest peak current subgroup is the selected according to the updated peak currents of the remaining subgroups. Thus, the selected subgroups do not have duplicated cells. The selection process continues until all the M switching cells in the selected subgroups. In one embodiment of the present invention, to construct the time varying current for the cell group, the peaks of all the cell currents for a subgroup are aligned and centered at the center of the portion of the timing windows common to all cells in the subgroup (the intersection of the timing windows of the subgroup). Alternatively, the peaks of the cell currents for a subgroup may be aligned and centered at the center of the union of the timing windows of the subgroup. Further, the sorting of each subgroup can be done based on other metrics such as the total charge, instead of the peak current illustrated above. After the current waveforms of the cells in each subgroup are aligned at their peaks, the waveforms described earlier are added to create a composite waveform for all the switching cells.

Figure 11:
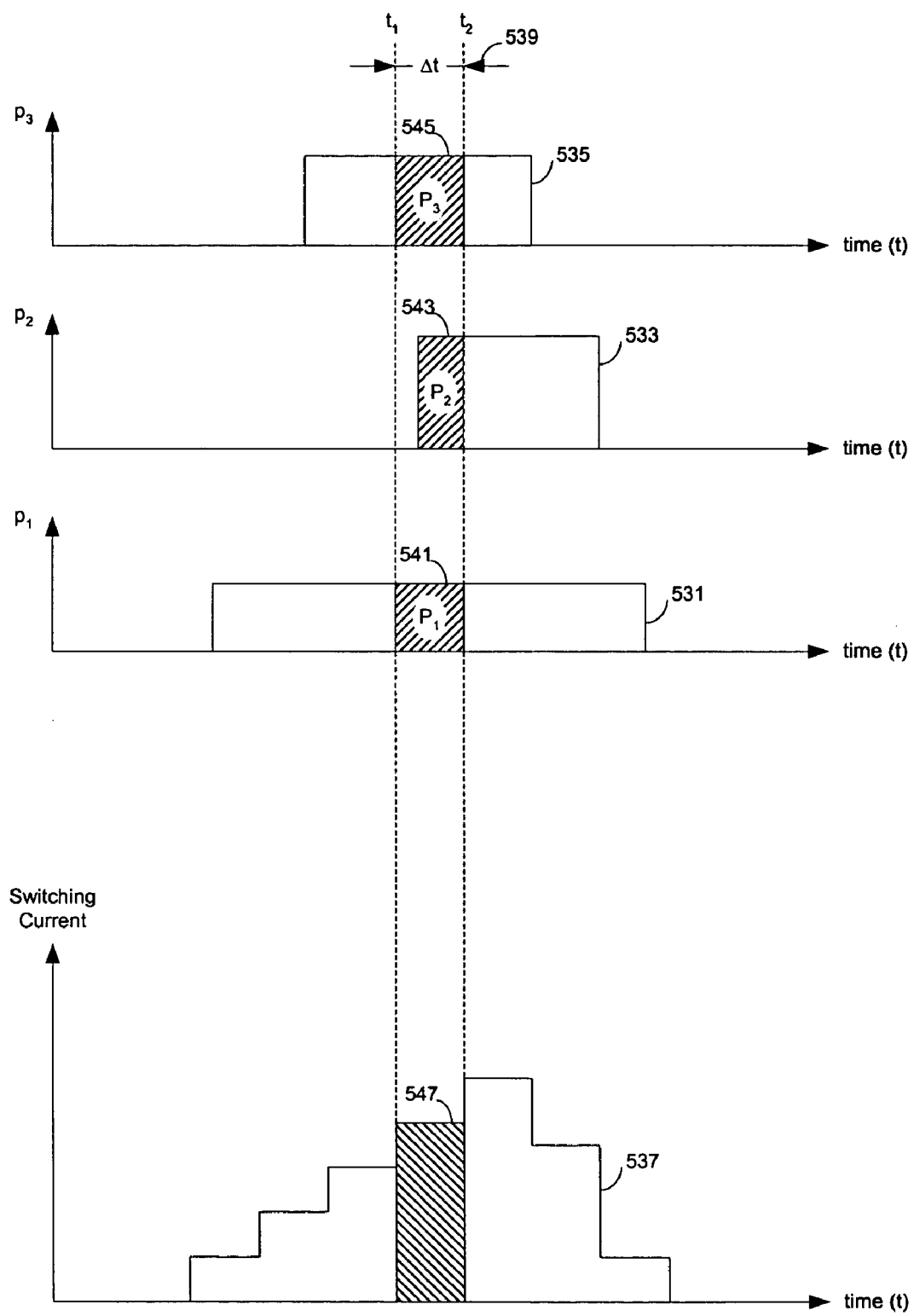
FIG. 11 shows a method to estimate a time varying current for a cell group using timing windows according to one embodiment of the present invention.

Alternatively, if the information regarding the "timing windows" is available, a probabilistic approach can also be used to determine a time varying current for the cell group. FIG. 11 shows a method to estimate a time varying current for a cell group using timing windows according to one embodiment of the present invention. For example, it can be assumed that the switching probability of each cell is uniformly distributed over the interval of the timing window. For example, if the probability of switching for a cell is p and the timing window for that cell is $t_w$ wide, the probability distribution is $p/t_w$ in the timing window and zero everywhere else. The integrated probability over the whole clock cycle is still p. Thus, the probability distribution for the cells in the cell group can be determined. For example, in FIG. 11, probability distributions 531, 533 and 535 shows the probability density for three cells to switch at given time. The example of FIG. 11 is illustrated with only three cells. In general, a cell group typically includes more than three cells, which can be processed in a similar fashion. Other assumptions of the probability distribution may also be used. During a given time interval, such as the time interval $[t_1, t_2]$ (539), the integration of the corresponding density functions of the cells provides the probabilities of the cells switching during the time interval. For example, areas 541, 543 and 545 show that the probabilities of switch for the three cells during time interval 539 are $P_1$, $P_2$ and $P_3$ respectively. Similar to that in the process for the determination of a threshold number of switching cells (or a threshold current, or a threshold charge) for the entire clock cycle (as described in detail above), a cumulative density function of a variable (e.g., the number of switching cells, the current, or the total charge) can be computed for this time interval. Thus, from a threshold on the cumulative density function, a threshold value for the variable can be determined in a similar fashion as determining a threshold value for the variable described for the entire clock cycle. The determined threshold value can be considered a constant in the time interval. For example, the cumulative density function of the switch current can be determined from the probabilities of switching in the time interval for the cells in the group (e.g., probabilities $P_1$ (541), $P_2$ (543) and $P_3$ (545)). The switching current corresponding to a threshold percentage of the cumulative density function is consider the switching current (547) for the time interval. Thus, when different time intervals are evaluated, a time varying current (537) is determined for the cell group.

Alternatively, from the probability distributions of cells switching during a clock cycle, a joint probability density function (and cumulative density function) for a number of cells switching together at any given point of time in a clock cycle can be determined. The joint probability can be the probability of the number of switching cells or the probability of a quantity computed based on the number of switching cells, such as peak current, total charge, etc. The joint probability density function (and cumulative density function) varies with respect to the point of time in a clock cycle. The joint probability density function (and cumulative density function) can be integrated over any time interval to obtain a joint probability density function (and cumulative density function) for the time period. From the joint probability density function (and cumulative density function) for any given time period, a statistical threshold for the quantity (e.g., the peak current, total charge, or the number of switching cells) corresponding to a probability threshold can be determined so that the probability of the quantity being small than the statistical threshold is smaller than a threshold level (e.g., 90% of the maximum value in the cumulative density function). The statistical threshold current can be used as the maximum likely peak current at that interval. The maximum likely peak current for different intervals can be computed in a similar fashion to obtain a time varying maximum likely current waveform for the cell group. Alternatively, the maximum likely peak current can be determined for each time instance in a similar fashion without integrating the joint probability density function (and cumulative density function) over a time interval.

If the information about the timing for the transitions in a clock cycle is not available, the M cells with the highest peak current can be selected as the switching cells. A default timing window may then be used to add the waveforms of the switching cells to generate the estimated current waveform for the cell group.

The estimated current waveform for the cell group represents the time varying current for the group of cells at the point in the power supply network where the cell group is located. A current source can be used to model the current waveform for the cell group.

The non-switching cells of the group provide de-coupling capacitance between the power supply rail and ground through the non-switching cells themselves. In one embodiment of the present invention, the output capacitances of non-switching cells are added as additional de-coupling capacitance at the node of the cell group in the top level circuit model. If the output resistance of the non-switching cell is available, the output resistance can also be included in the path from the de-coupling capacitor to the power supply network. The addition of this linear resistance and capacitor combination creates an extra node in the circuit representation. This extra node can be eliminated if the effect of the resistance and capacitor combination could be represented by an effective capacitance to ground added to the original node. A number of techniques are known in the field to approximate a resistance and capacitor combination by a capacitor by using current averaging techniques in the context of delay modeling which can be applied for the power mesh network reduction as well. See, for example, J. Qian, S. Pulella and L. Pillage, "Modeling the effective capacitance for the RC interconnect of CMOS gates," *IEEE Trans. On Computer Aided Design*, Vol. 13, No. 12, pp. 1526-1535, 1994.

The resistance of the power supply network can be extracted from the layout for all metal layers. The input to the extractor can be a data file with the physical layout information and a technology file describing the metal and via resistance for each layer. The output is a netlist with resistors that represent the interconnection between the cells. The resistance can be extracted by breaking up each wire in the power supply network into segments and then using either analytical formulas or tables to calculate the resistance of each segment. It is understood that any methods known in the field for extracting the resistance of the power supply network can be used. A commercially available software tool, such as Star-RCXT from Synposys, Inc. or Columbus from Sequence Design, Inc., can also be used.

In one embodiment of the present invention, three types of capacitances are included in the model for the power supply network: power supply to ground wire capacitance, well capacitance where the well is tied to one of the rails of the power supply network and the de-coupling capacitance from non-switching cells.

Power supply to ground wire capacitance and well capacitance are based on the geometry and area of the metal wiring and the cells. The power supply to ground capacitance can be calculated using the layout information to produce a netlist which has lumped capacitors to represent capacitance between the power supply wire and wires that are grounded or signal wires. As signal wires on average switch between ground and $V_{dd}$ (the power voltage), their net effect on the power supply network is small. Therefore, the capacitance between power supply network and signal wires may be ignored.

Analytical formulas or tables can be used to calculate the capacitance between the power supply and ground network. For example, Arora et al. (1996) described such methods in "Modeling and extraction of interconnect capacitance for multilayer VLSI circuits", IEEE Tran. on Computer Aided Design of Integrated Circuits and Systems, vol. 15, pp, 58-67, 1996. It is understood that any methods known in the field for extracting the capacitance between the power supply and ground network can be used. A commercially available software tool, such as Star-RCXT from Synposys, Inc. or Columbus from Sequence Design, Inc. can also be used.

The well capacitance can be derived from technology parameter of well-to-substrate capacitance per unit area by multiplying that value by the area of the cell that is the well. Alternatively, an average value (e.g., 0.50) of the well area may be used for all cells.

The de-coupling capacitance from non-switching cells can be calculated from the library by adding the load capacitance of all the non-switching cells in the group. This load capacitance will provide de-coupling capacitance through the non-switching gates.

Figure 7:
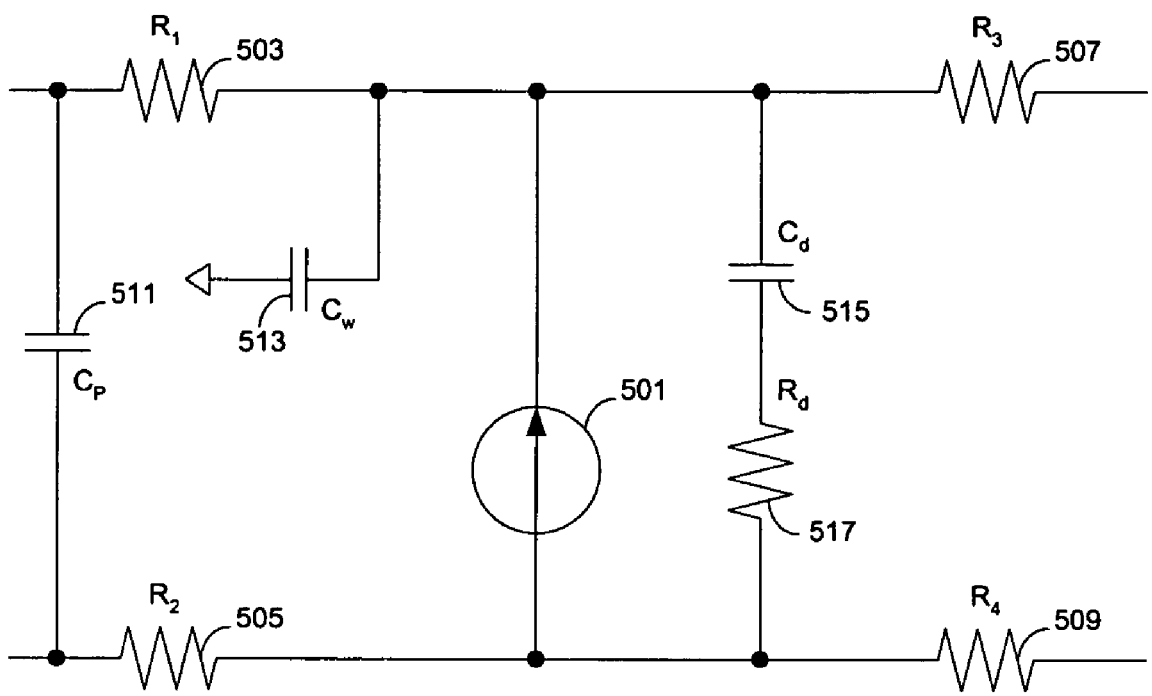
FIG. 7 illustrates the modeling of a cell group for the analysis of a power supply network according to one embodiment of the present invention.

FIG. 7 illustrates the modeling of a cell group for the analysis of a power supply network according to one embodiment of the present invention. In FIG. 7, resistors 503, 505, 507 and 509 represent the resistance of the power supply network near a cell group. Current source 501 represent the time varying current drawn by the group of cells, including the constant leakage currents of the cells and the time varying currents of the switching cells for transitions in the clock cycle. Capacitor 511 represents a portion of the capacitance between the power and ground wires near the cell group. Capacitor 513 represents the well capacitance of the cells of the group. Capacitor 515 and resistor 517 represent the de-coupling capacitance and resistance of the non-switching cells of the group.

Further, the inductance of the circuit may also be included in the model of the power supply network.

Once all the elements of the power supply network are modeled, a fast time-domain circuit solver can be used to obtain a transient solution of the system. The power supply network can be formulated as a coupled set of ordinary differential equations, which are then discretized in time to yield a set of linear equations that can be represented by a sparse matrix. The sparse matrix equation is solved at each time step to calculate the voltages in the power supply network at each time step.

Since the linear equation system has a sparse matrix, many fast time-domain solvers can be used to obtain a transient solution of the system efficiently, including the solution techniques described by Nassif and Kozhaya (2000) in "Fast power grid simulation", Proc. of Design Automation Conference (DAC), pp. 156-161, 2000 and by Chen and Chen (2001) in "Efficient large-scale power grid analysis based on pre-conditioned Krylov-subpace iterative methods", Proc. of Design Automation Conference (DAC), 2001.

Thus, the power supply voltage solution produced according to embodiments of the present invention can include the impact of the capacitance, inductance as well as the switching currents and the relative probability and timing of the transitions.

A power supply network includes a power network (e.g., for supplying power voltage $V_{dd}$) and a ground network (e.g., for supplying ground voltage $V_{ss}$). The power network and the ground network can be analyzed separately. For example, in the analysis of the ground network, it can be assumed that the power network provides perfect power voltage $V_{dd}$ on the entire power network; similarly, in the analysis of the ground network, it can be assumed that the ground network provides perfect ground voltage $V_{ss}$ on the entire ground network. In the analysis of the power network ($V_{dd}$), a timing window is determined based on when the output of a cell is rising. In the analysis of the ground network ($V_{ss}$), a timing window is determined based on when the output of a cell is falling. Alternatively, the power network and the ground network can be analyzed together. Thus, the resistance and capacitive parameters are extracted both for the power network and the ground network; and the timing window for both the rising and falling of the output are considered.

Figure 8:
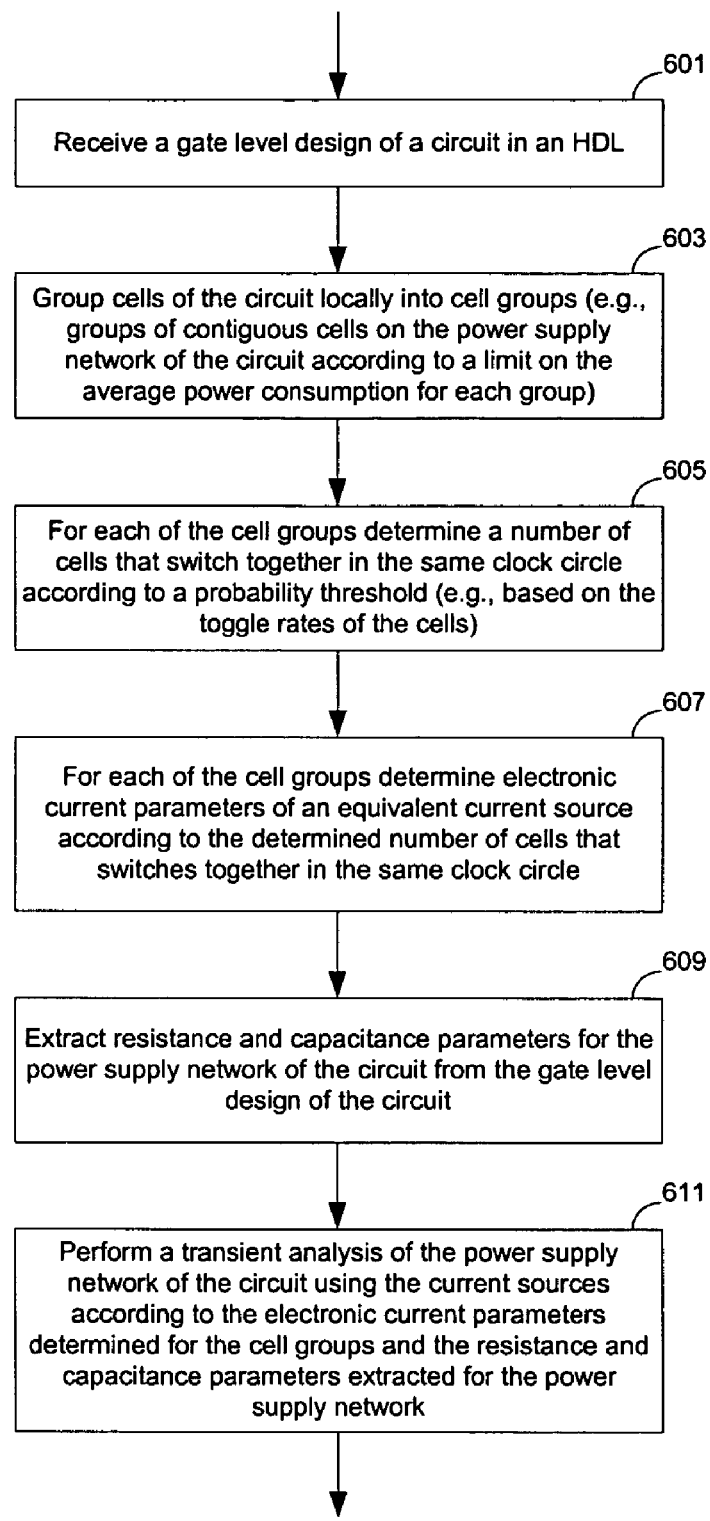
FIG. 8 shows a method to analyze a power supply network according to one embodiment of the present invention.

FIG. 8 shows a method to analyze a power supply network according to one embodiment of the present invention. After operation 601 receives a gate level design of a circuit in an HDL, operation 603 groups cells of the circuit locally into cell groups (e.g., groups of contiguous cells on the power supply network of the circuit according to a limit on the average power consumption for each group). For each of the cell groups operation 605 determines a number of cells that switch together in the same clock circle according to a probability threshold (e.g., based on the toggle rates of the cells). For each of the cell groups, operation 607 determines electronic current parameters of an equivalent current source according to the determined number of cells that switches together in the same clock circle. After operation 609 extracts resistance and capacitance parameters for the power supply network of the circuit from the gate level design of the circuit, operation 611 performs a transient analysis of the power supply network of the circuit using the current sources according to the electronic current parameters determined for the cell groups and the resistance and capacitance parameters extracted for the power supply network.

Figure 9:
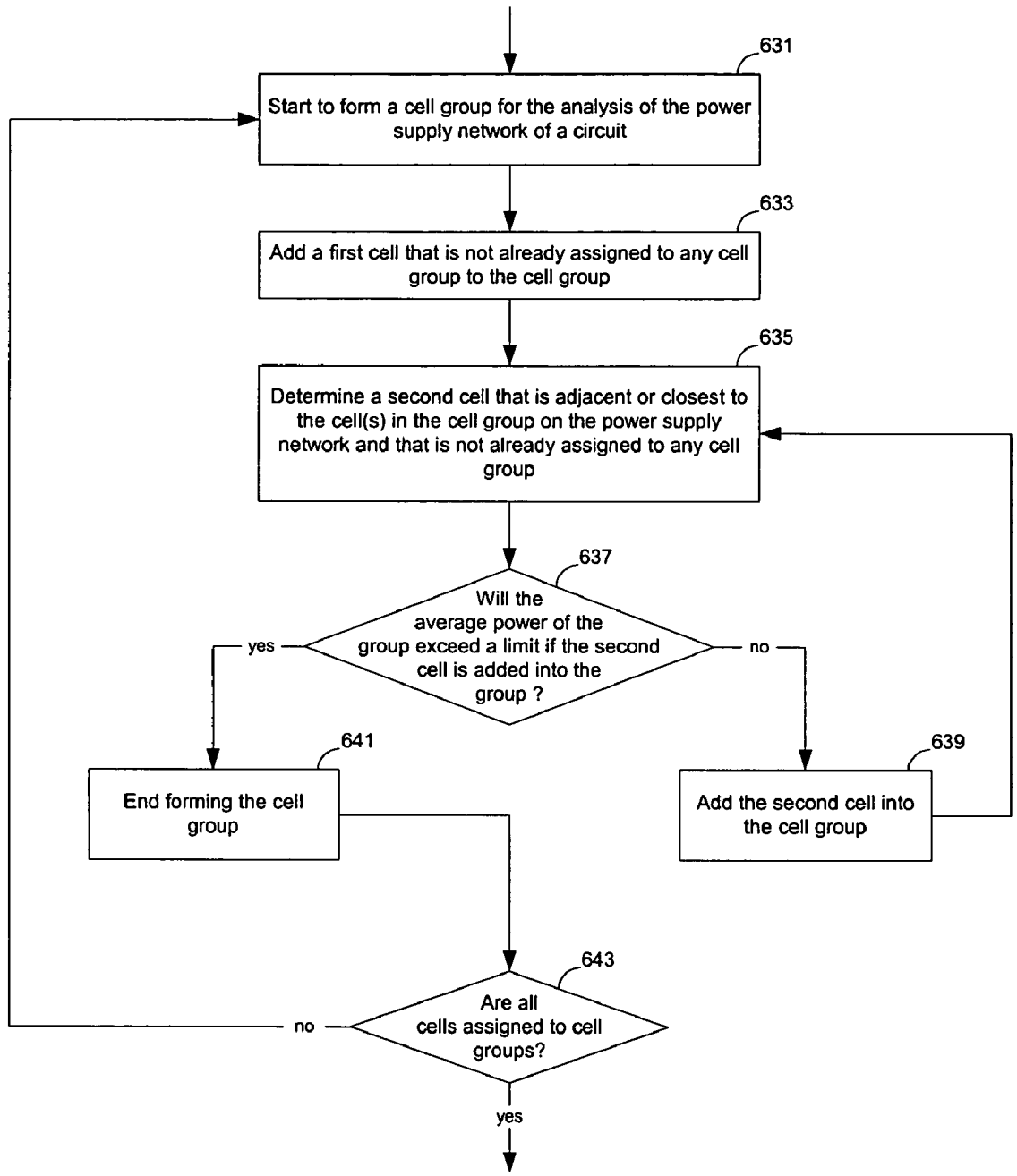
FIG. 9 illustrates a detailed method to group cells according to one embodiment of the present invention.

FIG. 9 illustrates a detailed method to group cells according to one embodiment of the present invention. Operation 631 starts to form a cell group for the analysis of the power supply network of a circuit. Operation 633 adds a first cell that is not already assigned to any cell group to the cell group. Operation 635 determines a second cell that is adjacent or closest to the cell(s) in the cell group on the power supply network and that is not already assigned to any cell group. If operation 637 determines that the average power of the group will not exceed a limit if the second cell is added into the group, operation 639 adds the second cell into the cell group; otherwise, operation 641 ends forming the cell group. Operations 635-639 are repeated until the average power of the group approximately reaches the limit. If operation 643 determines that not all cells are assigned to cell groups, operations 631-641 are repeated to form another cell group, until all cells are assigned to cell groups.

Figure 10:
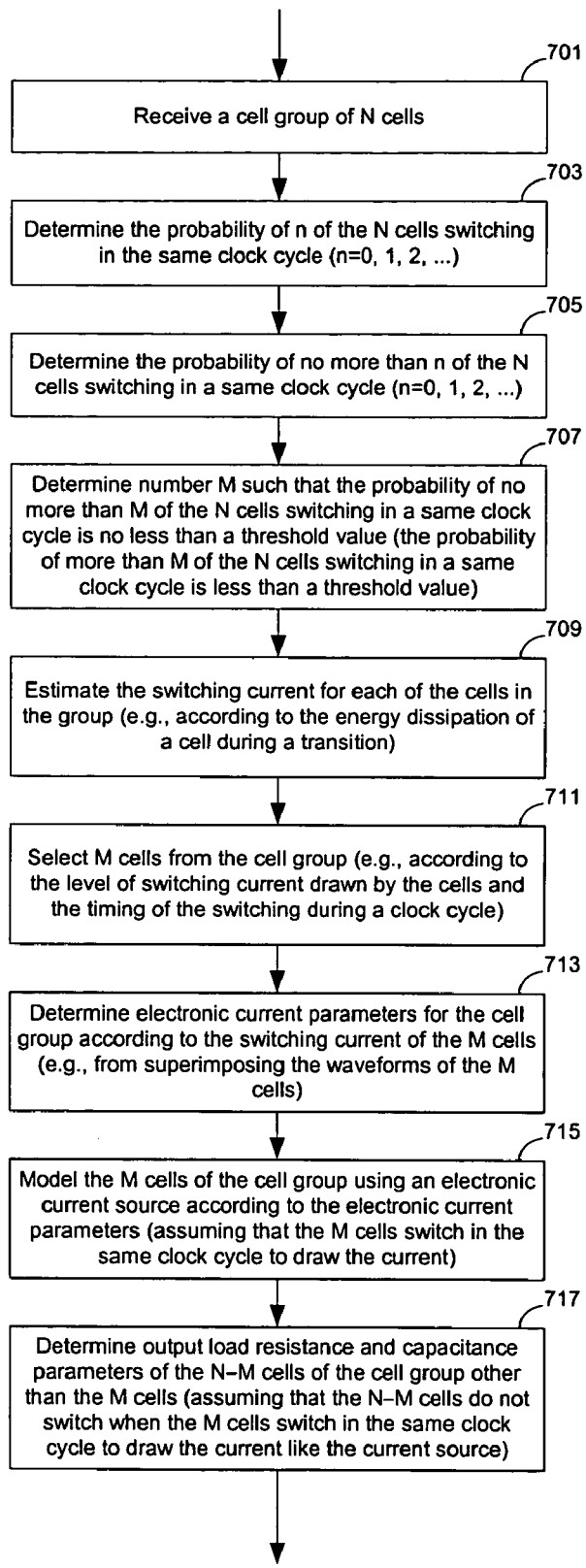
FIG. 10 shows a detailed method to generate a model of a cell group according to one embodiment of the present invention.

FIG. 10 shows a detailed method to generate a model of a cell group according to one embodiment of the present invention. After operation 701 receives a cell group of N cells, operation 703 determines the probability of n of the N cells switching in the same clock cycle (n=0, 1, 2, ... ). After operation 705 determines the probability of no more than n of the N cells switching in a same clock cycle (n=0, 1, 2, ... ), operation 707 determines number M such that the probability of no more than M of the N cells switching in a same clock cycle is no less than a threshold value (the probability of more than M of the N cells switching in a same clock cycle is less than a threshold value). When the cell group contains a large number of cells, the probability of n of the N cells switching in the same clock cycle may be not computed individually; instead, one or more lower bounds for the cumulated probability can be used to determined the number M. Operation 709 estimates the switching current for each of the cells in the group (e.g., according to the energy dissipation of a cell during a transition). Operation 711 selects M cells from the cell group (e.g., according to the level of switching current drawn by the cells and the timing of the switching during a clock cycle). The M cells are selected to switch together in a same clock cycle as a reasonable worst case scenario. Operation 713 determines electronic current parameters for the cell group according to the switching current of the M cells (e.g., from superimposing the waveforms of the M cells). The electronic current parameters represent a time varying current waveform for the cell group. Operation 715 models the M cells of the cell group using an electronic current source according to the electronic current parameters (assuming that the M cells switch in the same clock cycle to draw the current). Operation 717 determines output load resistance and capacitance parameters of the N-M cells of the cell group other than the M cells (assuming that the N-M cells do not switch when the M cells switch in the same clock cycle to draw the current like the current source). Further, well capacitance of the wells of the cells in the group can be extracted and modeled for the cell group.

Thus, in at least one embodiment of the present invention, after the cells are grouped locally and contiguously on the power supply network, a probability approach is used to estimate a reasonable worst case scenario for the current required by the cell group. Switching cells and non-switching cells are determined such that the probability of a current being larger than the estimation is below a threshold.

Grouping contiguous cells as cell groups significantly increases the capacity to analyze designs on a typical computer server (e.g., by more than 20 times over circuit level simulation such as SPICE) and significantly decreases the runtime (e.g., by over 100 times compared to SPICE like simulations for large designs). When the cells are grouped on the power supply network locally (e.g., according to an average power dissipation limit for cell groups), the design of the circuit does not have to be in a hierarchical style in which the lower level blocks or macros are custom designed so that their current characteristics can be generated from detailed SPICE like simulations. The size of the cell groups can be adjusted (e.g., by increasing or decreasing the power dissipation limit for cell groups) to balance the size of the top level circuit model for the power supply network and the detail levels in the solution of the power supply network. When the time varying currents for cell groups are estimated based on a probabilistic approach, no input vectors for cell groups are required to create the switching current waveforms for the cell groups based on the simulation of the cell groups. When the behaviors of the cell groups are not obtained through a detailed simulation, no circuit models for cells are required. Circuit models for cells are not always available for the cells in a library. However, it is understood that, when available, the circuit models for cells can also be used to derive the switching current for the individual cells.

Further, no special stimulus vectors at the inputs of the design are required. Therefore, the methods according to various embodiments of the present invention can be much faster than running large logic simulations with different input vectors. When reasonable estimates for the switching currents of cell groups are calculated based on the currents of the switching cells, no special stimulus vectors for a group of cells are required.

Since typical sets of input vectors cannot exhaustively analyzed all possible switching conditions, the analysis results according to embodiments of the present invention are typically more accurate than the results generated from switching waveforms produced by detailed simulations according to input vectors.

Although various operations are illustrated in specific sequences in the above example, it is understood that in general it is not necessary to perform the operations in the exact sequences as illustrated. From this description, a person skilled in art can envision various possible sequences.

Many of the methods of the present invention may be performed with a digital processing system, such as a conventional, general-purpose computer system. Special purpose computers, which are designed or programmed to perform only one function, may also be used.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be a Sun workstation, or a personal computer (PC) running a Windows operating system, or an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103 is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

While most embodiments of the present invention are intended for use in an HDL design synthesis software program, the invention is not necessarily limited to such use. Use of other languages and computer programs is possible. For example, a computer program may be written to describe hardware and thus be considered an expression in an HDL. Alternatively, the invention, in some embodiments, may allocate and reallocate a logic representation, e.g. a netlist, which was created without the use of an HDL. Embodiments of the present invention will be described in the context of, but not limited to, use in HDL synthesis systems, and particularly those designed for use with integrated circuits which have vendor-specific technology/architectures. As is well known, the target architecture is typically determined by a supplier of ICs. Embodiments of the present invention can be employed with application-specific integrated circuits (ASICs), including Structured ASICs and Platform ASICs, from vendors such as LSI Logic, NEC, IBM, Artisan Components Inc. Certain embodiments of the present invention can also be employed with programmable ICs. An example of a target architecture is the programmable lookup tables (LUTs) and associated logic of the integrated circuits which are field programmable gate arrays from Xilinx, Inc. of San Jose, Calif. Other examples of target architecture/technology include those well known architectures in field programmable gate arrays and complex programmable logic devices from vendors such as Altera, Lucent Technology, Advanced Micro Devices, and Lattice Semiconductor.

Some portions of the detailed descriptions are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "estimating" or "selecting" or "modeling" or "receiving" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method for circuit analysis, the method comprising:
grouping cells of a design of a circuit into cell groups according to a cell group probability threshold for power dissipation; and
determining parameters specifying a time varying current, drawn by each of the cell groups from a power supply network of the circuit, for a transient analysis of the power supply network of the circuit.

2. The method of claim 1, further comprising:
performing the transient analysis of the power supply network of the circuit using the parameters specifying the time varying current determined for each of the cell groups.

3. The method of claim 1, wherein the cells of the design are grouped locally on the power supply network of the circuit.

4. The method of claim 3, wherein cells within each of the cell groups are contiguous on the power supply network of the circuit.

5. The method of claim 3, wherein the threshold for power dissipation specifies a limit of average power dissipation in each cell group.

6. The method of claim 3, wherein the design of the circuit comprises a gate level design; and wherein the cells of the design comprise technology specific standard cells for implementing the circuit on an Integrated Circuit (IC) chip.

7. The method of claim 1, wherein at least one of the parameters specifying the time varying current is determined for each of the cell groups using data indicating probabilities of state switching at cells.

8. The method of claim 7, wherein, for at least one of the cell groups, the parameters specifying the time varying current are determined for a plurality of time intervals in a clock cycle using the data indicating probabilities of state switching at cells and data indicating timing windows for state switching.

9. The method of claim 8, wherein, for each of the plurality of time intervals, one or more parameters specifying the time varying current are determined from estimations of probability densities of state switching at cells based on the data indicating probabilities of state switching at cells and the data indicating timing windows for state switching.

10. The method of claim 9, wherein the probability densities are estimated as uniform distributions over the timing windows.

11. The method of claim 7, wherein the data indicating probabilities of state switching at cells comprise toggle rates of cells.

12. The method of claim 7, wherein said determining the parameters specifying the time varying current comprises:
estimating a switching current for each cell of each of the cell groups using data specifying energy dissipation at a corresponding cell during a state transition in a clock cycle; and
determining a number of first cells that switch in a same clock cycle for each of the cell groups using the data indicating probabilities of state switching at cells;
wherein the time varying current drawn by each of the cell groups includes at least switching currents for the number of the first cells that switch in a same clock cycle.

13. The method of claim 12, wherein the number of the first cells are determined for each of the cell groups such that a probability of more than the number of cells switching in a same clock cycle is less than a threshold value.

14. The method of claim 13, wherein the number of the first cells are determined for each of the cell groups to maximize a peak value of the time varying current while the probability of more than the number of cells switching in a same clock cycle is close to the threshold value.

15. The method of claim 13, wherein the threshold value is less than one.

16. The method of claim 13, further comprising:
determining, for each of the cell groups but excluding the number of the first cells, decoupling capacitance parameters of second cells for not switching;
wherein the transient analysis uses the decoupling capacitance parameters.

17. The method of claim 16, further comprising:
extracting resistance and capacitance parameters of the power supply network from the design of the circuit;
wherein the transient analysis further uses the resistance and capacitance parameters.

18. The method of claim 17, further comprising:
extracting well capacitance parameters of wells of cells from the design of the circuit;
wherein the transient analysis further uses the well capacitance parameters.

19. The method of claim 18, wherein the transient analysis is performed through solving a set of linear equations with a sparse matrix obtained from discretizing a set of ordinary differential equations based on current sources according to the time varying current for each of the cell groups, the resistance and capacitance parameters of the power supply network, the well capacitance parameters, and the decoupling capacitance parameters.

20. A machine readable medium containing executable computer program instructions which when executed by a data processing system cause said system to perform a method for circuit analysis, the method comprising:
grouping cells of a design of a circuit into cell groups according to a cell group probability threshold for power dissipation; and
determining parameters specifying a time varying current, drawn by each of the cell groups from a power supply network of the circuit, for a transient analysis of the power supply network of the circuit.

21. The medium of claim 20, wherein the method further comprises:
performing the transient analysis of the power supply network of the circuit using the parameters specifying the time varying current determined for each of the cell groups.

22. The medium of claim 20, wherein the cells of the design are grouped locally on the power supply network of the circuit.

23. The medium of claim 22, wherein cells within each of the cell groups are contiguous on the power supply network of the circuit.

24. The medium of claim 22, wherein the threshold for power dissipation specifies a limit of average power dissipation in each cell group.

25. The medium of claim 22, wherein the design of the circuit comprises a gate level design; and wherein the cells of the design comprise technology specific standard cells for implementing the circuit on an Integrated Circuit (IC) chip.

26. The medium of claim 20, wherein at least one of the parameters specifying the time varying current is determined for each of the cell groups using data indicating probabilities of state switching at cells.

27. The medium of claim 26, wherein the data indicating probabilities of state switching at cells comprise toggle rates of cells.

28. The medium of claim 26, wherein said determining the parameters specifying the time varying current comprises:
estimating a switching current for each cell of each of the cell groups using data specifying energy dissipation at a corresponding cell during a state transition in a clock cycle; and
determining a number of first cells that switch in a same clock cycle for each of the cell groups using the data indicating probabilities of state switching at cells;
wherein the time varying current drawn by each of the cell groups includes at least switching currents for the number of the first cells that switch in a same clock cycle.

29. The medium of claim 28, wherein the number of the first cells are determined for each of the cell groups such that a probability of more than the number of cells switching in a same clock cycle is less than a threshold value.

30. The medium of claim 29, wherein the number of the first cells are determined for each of the cell groups to maximize a peak value of the time varying current while the probability of more than the number of cells switching in a same clock cycle is close to the threshold value.

31. The medium of claim 29, wherein the threshold value is less than one.

32. The medium of claim 29, wherein the method further comprises:
   determining, for each of the cell groups but excluding the number of the first cells, decoupling capacitance parameters of second cells for not switching;
   wherein the transient analysis uses the decoupling capacitance parameters.

33. The medium of claim 32, wherein the method further comprises:
   extracting resistance and capacitance parameters of the power supply network from the design of the circuit;
   wherein the transient analysis further uses the resistance and capacitance parameters.

34. The medium of claim 33, wherein the method further comprises:
   extracting well capacitance parameters of wells of cells from the design of the circuit;
   wherein the transient analysis further uses the well capacitance parameters.

35. The medium of claim 34, wherein the transient analysis is performed through solving a set of linear equations with a sparse matrix obtained from discretizing a set of ordinary differential equations based on current sources according to the time varying current for each of the cell groups, the resistance and capacitance parameters of the power supply network, the well capacitance parameters, and the decoupling capacitance parameters.

36. A date processing system for circuit analysis, the data processing system comprising:
   means for grouping cells of a design of a circuit into cell groups according to a cell group probability threshold for power dissipation; and
   means for determining parameters specifying a time varying current, drawn by each of the cell groups from a power supply network of the circuit, for a transient analysis of the power supply network of the circuit.

37. The data processing system of claim 36, further comprising:
   means for performing the transient analysis of the power supply network of the circuit using the parameters specifying the time varying current determined for each of the cell groups.

38. The data processing system of claim 36, wherein the cells of the design are grouped locally on the power supply network of the circuit.

39. The data processing system of claim 38, wherein cells within each of the cell groups are contiguous on the power supply network of the circuit.

40. The data processing system of claim 38, wherein the threshold for power dissipation specifies a limit of average power dissipation in each cell group.

41. The data processing system of claim 38, wherein the design of the circuit comprises a gate level design; and wherein the cells of the design comprise technology specific standard cells for implementing the circuit on an Integrated Circuit (IC) chip.

42. The data processing system of claim 36, wherein at least one of the parameters specifying the time varying current is determined for each of the cell groups using data indicating probabilities of state switching at cells.

43. The data processing system of claim 42, wherein the data indicating probabilities of state switching at cells comprise toggle rates of cells.

44. The data processing system of claim 42, wherein said means for determining the parameters specifying the time varying current comprises:
   means for estimating a switching current for each cell of each of the cell groups using data specifying energy dissipation at a corresponding cell during a state transition in a clock cycle; and
   means for determining a number of first cells that switch in a same clock cycle for each of the cell groups using the data indicating probabilities of state switching at cells;
   wherein the time varying current drawn by each of the cell groups includes at least switching currents for the number of the first cells that switch in a same clock cycle.

45. The data processing system of claim 44, wherein the number of the first cells are determined for each of the cell groups such that a probability of more than the number of cells switching in a same clock cycle is less than a threshold value.

46. The data processing system of claim 45, wherein the number of the first cells are determined for each of the cell groups to maximize a peak value of the time varying current while the probability of more than the number of cells switching in a same clock cycle is close to the threshold value.

47. The data processing system of claim 45, wherein the threshold value is less than one.

48. The data processing system of claim 45, further comprising:
   means for determining, for each of the cell groups but excluding the number of the first cells, decoupling capacitance parameters of second cells for not switching;
   wherein the transient analysis uses the decoupling capacitance parameters.

49. The data processing system of claim 48, further comprising:
   means for extracting resistance and capacitance parameters of the power supply network from the design of the circuit;
   wherein the transient analysis further uses the resistance and capacitance parameters.

50. The data processing system of claim 49, further comprising:
   means for extracting well capacitance parameters of wells of cells from the design of the circuit;
   wherein the transient analysis further uses the well capacitance parameters.

51. The data processing system of claim 50, wherein the transient analysis is performed through solving a set of linear equations with a sparse matrix obtained from discretizing a set of ordinary differential equations based on current sources according to the time varying current for each of the cell groups, the resistance and capacitance parameters of the power supply network, the well capacitance parameters, and the decoupling capacitance parameters.

* * * * *